(12) United States Patent
Dumbrell et al.

(10) Patent No.: US 11,722,095 B2
(45) Date of Patent: Aug. 8, 2023

(54) METHOD AND APPARATUS FOR TESTING SOLAR CELL PERFORMANCE

(71) Applicant: ZHEJIANG JINKO SOLAR CO., LTD., Zhejiang (CN)

(72) Inventors: Robert William Dumbrell, Zhejiang (CN); Menglei Xu, Zhejiang (CN); Jie Yang, Zhejiang (CN); Xinyu Zhang, Zhejiang (CN)

(73) Assignee: ZHEJIANG JINKO SOLAR CO., LTD., Zhejiang (CN)

(*) Notice: Subject to any disclaimer, the term of this patent is extended or adjusted under 35 U.S.C. 154(b) by 0 days.

(21) Appl. No.: 17/665,481

(22) Filed: Feb. 4, 2022

(65) Prior Publication Data

US 2023/0170845 A1 Jun. 1, 2023

(30) Foreign Application Priority Data

Dec. 1, 2021 (CN) .......................... 202111450368.4

(51) Int. Cl.
*H02S 50/15* (2014.01)

(52) U.S. Cl.
CPC .................................... *H02S 50/15* (2014.12)

(58) Field of Classification Search
None
See application file for complete search history.

(56) References Cited

U.S. PATENT DOCUMENTS

| 10,027,278 | B2 | 7/2018 | Sinton et al. |
| 10,574,180 | B2* | 2/2020 | De Vos .................... H02S 50/15 |
| 2012/0142125 | A1 | 6/2012 | Trupke et al. |
| 2018/0159469 | A1* | 6/2018 | Trupke .................... H02S 50/15 |
| 2019/0178800 | A1 | 6/2019 | Trupke et al. |

FOREIGN PATENT DOCUMENTS

| CN | 103308491 A | 9/2013 |
| CN | 104282593 A | 1/2015 |
| CN | 108931716 A | 12/2018 |
| CN | 111373243 A | 7/2020 |
| CN | 113075172 A | 7/2021 |

OTHER PUBLICATIONS

Mark J. Kerr et al., "Generalized analysis of quasi-steady-state and transient decay open circuit voltage measurements," Journal of Applied Physics, vol. 91, No. 1, p. 399-404, 2002, 7 pgs.

Ziv Hameiri et al., "Imaging the local ideality factor by contactless photoluminescence measurement," Applied Physics Letters, vol. 103, No. 2, 2013, 6 pgs.

(Continued)

*Primary Examiner* — Patrick Assouad
*Assistant Examiner* — Haidong Zhang
(74) *Attorney, Agent, or Firm* — USCH Law, PC

(57) ABSTRACT

A method and apparatus for testing solar cell performance. The method for testing solar cell performance includes: provide a solar cell; illuminating the solar cell; acquire an illumination intensity of light onto the solar cell; acquire a luminous intensity of light emitted from the solar cell in response to the solar cell being illuminated; and determine the solar cell performance based on the illumination intensity and the luminous intensity.

17 Claims, 5 Drawing Sheets

(56) References Cited

OTHER PUBLICATIONS

J. A. Giesecke et al., "Self-sufficient minority carrier lifetime in silicon from quasi-steady-state photoluminescence," Applications and Materials Science, vol. 209, No. 11, pp. 2286-2290, 2012, 6 pgs.
Zhejiang Jinko Solar Co., Ltd., Extended European Search Report, EP 22153968.7, dated Jun. 29, 2022, 7 pgs.
Jiang Xiao Yu, et al., "Defects detection in crystalline silicon solar cells based on electroluminescence imaging", International Symposium On Photoelectronic Detection and Imaging 2011, Advances in Infrared Imaging and Applications, SPIE, 1000 20th St. Bellingham WA 98225-6705 USA, vol. 8193, No. 1, Aug. 25, 2011, 7 pgs.

\* cited by examiner

METHOD AND APPARATUS FOR TESTING SOLAR CELL PERFORMANCE

CROSS-REFERENCE TO RELATED APPLICATION

The application claims priority to Chinese Patent Application No. 202111450368.4, filed on Dec. 1, 2021, the content of which is incorporated herein by reference in its entirety.

TECHNICAL FIELD

Embodiments of the present disclosure relate to the field of solar energy technology, and in particular to a method and an apparatus for testing solar cell performance.

BACKGROUND

Solar cell performance is impacted by a defect in the solar cell. More defects in the solar cell cause worse solar cell performance, such as lower photoelectric conversion efficiency. Therefore, defects in the solar cell usually require to be detected. Conventional detection methods include a photoluminescence detection technology and an electroluminescence detection technology. A defect type and a defect distribution of the solar cell are determined through an imaging technology.

SUMMARY

Some embodiments of the present disclosure provide a method and an apparatus for testing solar cell performance that are at least advantageous for implementing testing the solar cell performance based on an illumination intensity onto the solar cell and a luminous intensity of the solar cell.

According to the embodiments of the present disclosure, the method for testing solar cell performance includes: providing a solar cell; illuminating (i.e., projecting light onto) the solar cell; acquiring an illumination intensity of light onto the solar cell; acquiring a luminous intensity of light emitted from the solar cell in response to the solar cell being illuminated; and determining the solar cell performance based on the illumination intensity and the luminous intensity.

In some examples, the determining the solar cell performance based on the illumination intensity and the luminous intensity includes: acquiring a local ideality factor based on the illumination intensity and the luminous intensity; and acquiring the local ideality factor according to the following formula:

$$m = \frac{G}{I_{PL}} \times \left(\frac{dG}{dI_{PL}}\right)^{-1}.$$

Herein, m is the local ideality factor, G is a generation rate, and $I_{PL}$ is the luminous intensity.

In some examples, a relationship between the generation rate and the illumination $G = \Phi_{illum} q W (1 - R_{sample})$. Herein, $\Phi_{illum}$ is the illumination intensity, q is an elementary charge, W is a thickness of the solar cell, and $R_{sample}$ is an average reflectance of the solar cell.

In some examples, the determining the solar cell performance further includes: determining the solar cell performance according to the acquired local ideality factor. It is indicated that the solar cell does not include an injection dependent recombination defect in a case that the local ideality factor is equal to 1. It is indicated that the solar cell includes the injection dependent recombination defects in a case that the local ideality factor is greater than 1. A higher local ideality factor indicating a greater impact of the injection dependent recombination defects on the solar cell performance.

In some examples, the method further includes: adjusting the illumination intensity, each illumination intensity corresponding to a respective luminous intensity; and determining the solar cell performance based on the each illumination intensity and the corresponding respective luminous intensity, to determine an effect of varied illumination intensities on the solar cell performance.

In some examples, the method further includes: acquiring an implied open-circuit voltage of the solar cell based on the luminous intensity. Herein, a relationship between the implied open-circuit voltage and the luminous intensity is:.

$$iVoc = \frac{kT}{q} \ln\left(\frac{I_{PL}}{C}\right)$$

Herein, iVoc is the implied open-circuit voltage, k is a Boltzmann constant, T is a temperature of an environment where the solar cell is located, q is an elementary charge, $I_{PL}$ is the luminous intensity and C is a calibration constant.

In some examples, the solar cell has a first surface. The method further includes: controlling to illuminate the whole first surface, and controlling to illuminate the whole first surface with an uniform illumination intensity.

In some examples, the solar cell has a first surface and a second surface that is opposite to the first surface. In response to the first surface being illuminated, the whole second surface emits light. The acquiring the luminous intensity of the emitted light includes: acquiring an average luminous intensity of the light emitted from the whole second surface.

In some examples, the solar cell is a finished solar cell or a semi-finished solar cell at any stage during a process for preparing the finished solar cell.

According to the embodiments of the present disclosure, the apparatus for testing solar cell performance includes: an illumination module; an illumination intensity detection module, located on a transmission path of light emitted from the illumination module; and a luminous intensity detection module, located at a side of the illumination intensity detection module away from the illumination module. The luminous intensity detection module includes a chamber, having an opening at a side of the chamber close to the illumination module, the opening being provided to support the solar cell; and a luminous intensity detection unit, located on a side wall of the chamber.

In some examples, the chamber is a polyhedral chamber formed by a light shielding material, and the polyhedral chamber has the opening.

In some examples, the luminous intensity detection unit is an InGaAs photoelectrical detector or a silicon photoelectrical detector.

In some examples, the apparatus for testing solar cell performance further includes a first filter and/or a second filter located at a side of the luminous intensity detection unit away from the side wall of the chamber. The first filter is configured to allow light having a wavelength less than a first preset value to pass through the first filter to the luminous intensity detection unit, the first preset value ranges from 1220 nm to 1280 nm. The second filter is configured to allow light having a wavelength greater than or equal to a second preset value to pass through the second filter to the luminous intensity detection unit, the second preset value ranges from 930 nm to 990 nm.

In some examples, the apparatus for testing solar cell performance further includes an analysis module configured to determine the solar cell performance based on the illumination intensity acquired by the illumination intensity detection module and the luminous intensity acquired by the luminous intensity detection module.

In some examples, the illumination module includes a plurality of lamps arranged in arrays, the plurality of lamps are configured to emit light having a same wavelength, and vertical distances between each of the plurality of lamps and a plane where the opening is provided are the same.

In some examples, the solar cell has a first surface and a second surface that is opposite to the first surface, the illumination module is configured to illuminate the whole first surface, the second surface is configured to cover the opening, and a ratio between an orthographic projection area of the opening on the second surface and an area of the second surface ranges from 0.1 to 0.99.

BRIEF DESCRIPTION OF THE DRAWINGS

One or more embodiments are exemplified by the drawings. The illustration does not constitute a limitation to the embodiments. Elements with the same reference numerals in the drawings are denoted as similar elements. Unless otherwise stated, the drawings do not constitute a proportional limitation.

DETAILED DESCRIPTION

Figure 1:
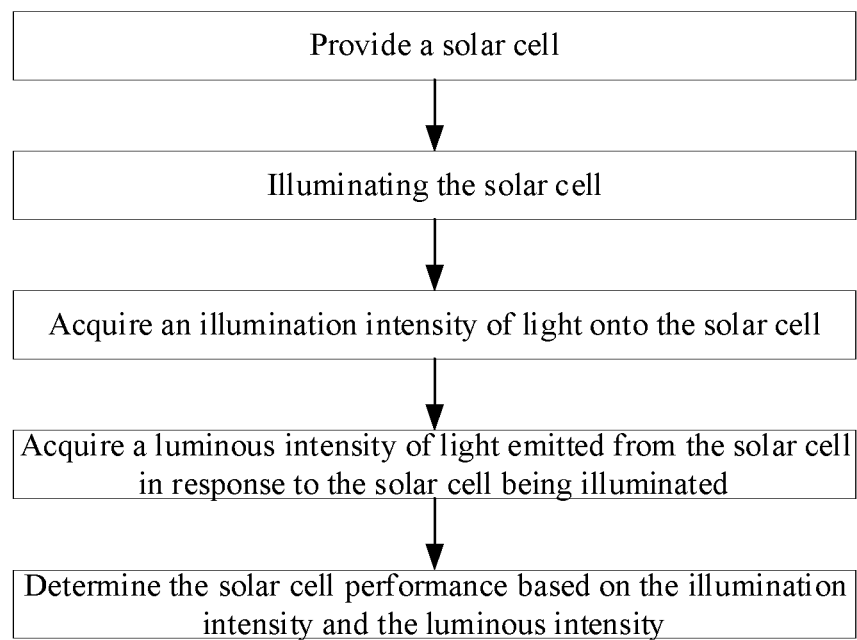
FIG. 1 is a flowchart showing a method for testing solar cell performance according to an embodiment of the present disclosure.

The electroluminescence detection technology is generally applied to detect a finished solar cell, and the finished solar cell has to be connected to a circuit. As a result, a detection result may be affected by a contact between a probe and the solar cell as well as serial resistance. Further, the electroluminescence detection technology is not applicable for defect detection of a semi-finished solar cell during production of the solar cell. The photoluminescence detection technology is generally applied to detect a solar cell at a single illumination intensity, but cannot be easily applied at multiple illumination intensities in mass production of the solar cell, and thus the photoluminescence detection technology has poor universality. Moreover, for the electroluminescence detection technology and the photoluminescence detection technology, a camera has to be used to acquire an electroluminescent image or a photoluminescence image for detecting and evaluating the solar cell performance through the electroluminescent imaging or the photoluminescence imaging, and the detection is costly.

It can be known from the above that in a conventional process for preparing a solar cell, there is no method for performing defect detection on a semi-finished solar cell without using an imaging technology.

Based on analysis, it is found that the electroluminescence detection technology is based on an electroluminescence property of crystalline silicon. A defect is acquired and determined through a near-infrared image of a solar cell. The near-infrared image is acquired through imaging by a high-resolution infrared camera. The electroluminescence detection technology is commonly used to detect abnormalities such as an internal defect, a crack, a fragment, virtual welding, a broken grid of a solar cell, and a single cell with different conversion efficiency. In the photoluminescence detection technology, an infrared technology is used to detect a crack, a hole, a micro-crystallization, an impurity or other hard spots of the solar cell. Besides, the photoluminescence detection technology is also used to detect locations and distribution of impurities and defects, and to systematically analyze cause for a reduced minority carrier lifetime of the solar cell. Accordingly, the infrared imaging technology is used in both the electroluminescence detection technology and the photoluminescence detection technology. Here, an infrared camera having expensive price is required, and thus detection is costly.

In addition, in the electroluminescence detection technology, a solar cell has to be connected to an external power supply, and a detection result may be affected by contact between a probe and the solar cell as well as serial resistance. In the photoluminescence detection technology, it is not easy to vary illumination intensities onto the solar cell. Therefore, neither the electroluminescence detection technology nor the photoluminescence detection technology can be easily applied to mass production of the solar cell.

Some embodiments of the present disclosure provide a method and an apparatus for testing solar cell performance. In the testing method, in one aspect, a solar cell does not have to be connected to an external circuit for testing. This is advantageous for avoiding effect due to contact between the solar cell and the external circuit as well as serial resistance during the testing, thereby improving accuracy of testing results. In another aspect, the solar cell performance is determined based on an illumination intensity onto the solar cell and a luminous intensity of the solar cell, thus the infrared imaging technology is not required. This is advantageous for reducing cost for testing. In still another aspect, the illumination intensity onto the solar cell and the luminous intensity of the solar cell may be acquired at any stage during preparing the solar cell. Therefore, the method for testing solar cell performance provided in the embodiments may be applied to any stage during preparing the solar cell.

In the following, the embodiments of the present disclosure will be described in detail with reference to the accompanying drawings. However, those of ordinary skill in the art can understand that in each embodiment of the present disclosure, technical details are provided in order to enable better understanding the embodiments of the present disclosure. However, without these technical details and various changes and modifications based on the following embodiments, the technical solutions claimed in the embodiments of the present disclosure can still be implemented.

An embodiment of the present disclosure provides a method for testing solar cell performance. FIG. 1 is a flowchart showing a method for testing solar cell performance according to the embodiment of the present disclosure.

With reference to FIG. 1, a solar cell is provided.

It shall be noted that the solar cell in the embodiment refers to a general solar cell. That is, the solar cell includes any one of: a solar cell, a solar cell string formed by solar cells by connection, or a solar cell module formed by the solar cell string and a packaging structure.

Herein, the solar cell may be a finished solar cell or a semi-finished solar cell at any stage during a process for preparing the finished solar cell. It may be understood that the process for preparing the finished solar cell may be any one of: a process for preparing a solar cell, a process for preparing a solar cell string or a process for preparing a solar cell module. Therefore, the method for testing solar cell performance provided in the embodiment of the present disclosure is applicable to any stage from a solar cell production to a solar cell module production.

In some examples, a solar cell may be a solar cell having a passivation film, or a solar cell having electrodes.

With further reference to FIG. 1, the solar cell is illuminated. That is, light is projected onto the solar cell.

It shall be noted that, generally, a light source having a particular wavelength is used as an excitation light source to provide photons having certain energy. After absorbing the photons, electrons at a ground state in the solar cell enter an excited state. An electron at the excited state is at a metastable state and would return to the ground state within a short period of time, and emits light having a particular wavelength range. Herein, the solar cell is illuminated and emits light having a luminous intensity that is proportional to a concentration of non-equilibrium minority carriers in the solar cell. Generally, an internal defect of the solar cell is a strong recombination center of the minority carriers. Therefore, a reduced concentration of the minority carriers in a certain region in the solar cell would cause reduction of recombination centers, and would cause reduction of luminous intensity generated from the region. Therefore, a test on the solar cell performance may be implemented based on the illumination intensity onto the solar cell and the luminous intensity from the solar cell.

In the following, a solar cell being illuminated is described in detail with two implementations. It shall be noted that, in this embodiment, manners for illuminating the solar cell include but not limited to the following two implementations.

In one implementation, the illumination intensity of light projected onto the solar cell may be adjusted. In one aspect, this is advantageous for testing the solar cell performance in environments having light of varied illumination intensities, so as to analyze effects of the varied illumination intensities on the solar cell performance. In another aspect, in practice, illumination intensities of sunlight onto the solar cell changes with time (e.g., morning, noon or evening). This is advantageous for simulating change of the solar cell performance in practice, and is advantageous for improving accuracy of the test result. In still another aspect, the testing method provided in this embodiment may be applied to tests under various illumination intensities, as a result, the testing method may be applied to various solar cells during a mass production of the solar cells. This is advantageous for improving universality of the testing method.

In another implementation, the solar cell has a first surface. A whole first surface is controlled to be illuminated. Incident light onto the whole first surface is controlled to be uniform in illumination intensity. In other words, different regions of the whole first surface are controlled to absorb a same number of photons. That is, energies acquired in different regions of the whole first surface of the solar cell are the same, thereby avoiding a case where luminous intensities of light emitted from different regions vary due to the fact that energies of photons acquired in the different regions of the solar cell vary. This is advantageous for ensuring that, during a testing process, a main factor affecting the luminous intensity of the solar cell is the solar cell performance per se, for example, an internal defect of the solar cell. This excludes an effect of an external environmental factor on the luminous intensity of the solar cell. It shall be noted that the incident light onto the whole first surface is controlled to have a uniform illumination intensity refers to: there may be a difference among illumination intensities of the incident light onto varied regions of the entire first surface, but a ratio of the difference to a standard illumination intensity of the incident light ranges from −10% to 10%. In an example, a ratio of the difference to the standard illumination intensity ranges from −5% to 5%. In some examples, a main material for the solar cell is silicon. In response to the silicon being illuminated, a wavelength of light emitted from the silicon ranges from 950 nm to 1200 nm. Therefore, the wavelength of light onto the solar cell may be controlled to be less than or equal to 950 nm. This is advantageous for preventing taking light onto the solar cell as light emitted from the solar cell, upon measuring the luminous intensity of the solar cell. This is advantageous for improving accuracy of the luminous intensity acquired of the solar cell.

With further reference to FIG. 1, an illumination intensity of light onto the solar cell is acquired.

It shall be noted that manners for acquiring the illumination intensity of the light onto the solar cell include but not limited to using an illumination intensity detector or a photodiode.

With further reference to FIG. 1, the solar cell emits light in response to being illuminated, and a luminous intensity of the emitted light is acquired.

In some examples, in response to that the solar cell is illuminated, electrons at a ground state in the solar cell would absorb energy of photons and emit light of a particular wavelength range, i.e., a photoluminescence phenomenon. A luminous intensity of light emitted from the solar cell in response to being illuminated is impacted by a defect in the solar cell. Therefore, the solar cell performance may be determined based on a luminous intensity of light from the solar cell.

It shall be noted that manners for acquiring a luminous intensity of light emitted from the solar cell include but not limited to using an InGaAs photoelectrical detector or a silicon photoelectrical detector.

In some examples, the illumination intensity is adjusted. Each illumination intensity corresponds to a respective luminous intensity. The solar cell performance is determined based on the illumination intensity and the luminous intensity. In this way, an effect of varied illumination intensities on the solar cell performance can be determined.

When the solar cell is illuminated under light with different illumination intensities, the internal defect of the solar cell has varied effects on the solar cell performance. In an example, in regard to a particular defect in the solar cell, if an illumination intensity of light onto the solar cell is equivalent to an illumination intensity of sunlight onto the solar cell at noon, the defect has minor effect on the solar cell performance. As an example, the defect would slightly reduce an open circuit voltage of the solar cell. However, if an illumination intensity of light onto the solar cell is equivalent to half the illumination intensity of the sunlight onto the solar cell at noon, the defect has major effect on the solar cell performance. As an example, the defect would significantly reduce the open circuit voltage of the solar cell, while affecting a fill factor and the solar cell efficiency. Therefore, by adjusting the illumination intensity and acquiring corresponding luminous intensity of light emitted from the solar cell under each of the illumination intensities, it is advantageous for analysis on effects of varied illumination intensity on the solar cell performance. In addition, this may be applied to multiple types of solar cells during a mass production of the solar cells, and is advantageous for improving universality of the testing method.

In some examples, the solar cell has the first surface and a second surface that is opposite to the first surface. In response to the first surface of the solar cell being illuminated, a whole second surface emits light. The acquiring a luminous intensity of the emitted light is: acquiring an average luminous intensity of the emitted light from the whole second surface. In this way, a whole solar cell performance may be tested and evaluated. This can prevent a case where during a performance test on a partial region of the solar cell, the partial region has good performance, while a certain region other than the partial region has multiple internal defects that impact performance of the whole solar cell. Therefore, this is advantageous for implementing a comprehensive test on the whole solar cell performance.

Herein, the whole first surface may be controlled to be illuminated, and illumination intensity of incident light onto the whole first surface may be controlled to be uniform. This is advantageous for further improving accuracy of the comprehensive test on the solar cell performance.

With further reference to FIG. 1, the solar cell performance is determined based on the illumination intensity and the luminous intensity.

In some examples, that the solar cell performance is determined based on the illumination intensity and the luminous intensity includes the following operations.

A local ideality factor may be acquired based on the illumination intensity and the luminous intensity according to the following formula:

$$m = \frac{G}{I_{PL}} \times \left(\frac{dG}{dI_{PL}}\right)^{-1}.$$

Herein, m is the local ideality factor, G is a generation rate, and $I_{PL}$ is the luminous intensity.

It shall be noted that the local ideality factor indicates whether the solar cell has a defect. In a case that the solar cell has the defects, a higher local ideality factor indicates a greater impact of the defects on worsening the solar cell performance. In practice, the illumination intensity of light onto the solar cell may be gradually adjusted. For example, the illumination intensity of the light onto the solar cell may be gradually increased to acquire $$\left(\frac{dG}{dI_{PL}}\right)^{-1}.$$

Herein, $$\left(\frac{dG}{dI_{PL}}\right)^{-1}$$

denotes a reciprocal of a local slope of a plot of $I_{PL}$ vs G.

Herein, a relationship between the generation rate and the illumination intensity is according to the following formula:

$$G = \Phi_{illum} q W (1 - R_{sample}).$$

Herein, $\Phi_{illum}$ is the illumination intensity, q is an elementary charge, W is a thickness of the solar cell, and $R_{sample}$ is an average reflectance of the whole solar cell.

In some example, that the solar cell performance is determined further includes determining the solar cell performance according to the acquired local ideality factor. If the local ideality factor is equal to 1, it indicates that the solar cell does not include an injection dependent recombination defect. If the local ideality factor is greater than 1, it indicates that the solar cell includes the injection dependent recombination defects, and a higher local ideality factor indicates a greater impact of the injection dependent recombination defects on worsening the solar cell performance. In this way, based on the local ideality factor, the solar cell performance may be analyzed without using the infrared imaging technology. This is advantageous for reducing testing cost.

It shall be noted that the defect of the solar cell includes a light dependent recombination defect or other defects. The light dependent recombination defect includes a crack, a broken grid or a scratch. The other defects include an edge recombination defect or a depletion region recombination defect. If the local ideality factor is less than 1, it indicates that the solar cell performance is impacted by an intrinsic recombination like an Auger recombination. However, the intrinsic recombination is an intrinsic property of silicon, and has little correlation with a solar cell production process. If the local ideality factor is higher than 1, it indicates that the solar cell has a light dependent recombination defect, and indicates that a problem may exist in the solar cell production process. In addition, a higher local ideality factor indicates a greater impact of the light dependent recombination defects on worsening the solar cell performance. Therefore, by acquiring the local ideality factor based on the illumination intensity and the luminous intensity, impacts of different light dependent recombination defects on the solar cell performance or impacts of different illumination intensities on the solar cell performance may be analyzed.

In some examples, that the solar cell performance is determined may further include: acquiring an implied open-circuit voltage of the solar cell based on the luminous intensity. A relationship between the implied open-circuit voltage and the luminous intensity is according to the following formula:

$$iVoc = \frac{kT}{q} \ln\left(\frac{I_{PL}}{C}\right)$$

Herein, iVoc is the implied open-circuit voltage, k is a Boltzmann constant, T is a temperature of an environment where the solar cell is located, q is an elementary charge, $I_{PL}$ is the luminous intensity and C is a calibration constant.

In some examples, a temperature of an environment where the solar cell is located is 25° C., i.e., T is 25° C. Under the temperature of 25° C., $$\frac{kT}{q}$$

is approximately equal to 0.026.

It may be understood that the open circuit voltage of the illuminated solar cell directly corresponds to a recombination amount of carriers in the solar cell. In response to the solar cell being illuminated, current is generated. If the solar cell is not connected to an external circuit, current fails to flow away from the solar cell to enter to the external circuit, and carriers would be recombined in the solar cell. Herein, a longer lifetime of the solar cell, i.e., a longer recombination lifetime of the carriers in the solar cell, results in a higher open circuit voltage of the solar cell. The method for testing solar cell performance provided in this embodiment does not need to use a voltmeter to directly detect the open circuit voltage of the solar cell. The implied open-circuit voltage of the solar cell may be indirectly acquired by acquiring the luminous intensity of light emitted from the solar cell in response to being illuminated. This is advantageous for preventing an effect on testing caused by the solar cell connecting the external circuit and by serial resistance, and is advantageous for improving accuracy of the testing result.

In addition, in the testing method provided in this embodiment, in addition to acquiring the local ideality factor based on the illumination intensity onto the solar cell and the luminous intensity of the solar cell, the implied open-circuit voltage of the solar cell may be acquired based on the luminous intensity of the solar cell. This is advantageous for obtaining impacts of defects of the solar cell on the solar cell performance in a more comprehensive way.

To sum up, the solar cell performance is determined based on the illumination intensity of light onto the solar cell and the luminous intensity of light emitted from the solar cell, while the solar cell does not have to be connected to an external circuit for testing. This is advantageous for preventing an effect on testing caused by the solar cell connecting the external circuit and by serial resistance, and thus is advantageous for improving accuracy of the testing result. In addition, the infrared imaging technology is not required and thus the testing method is cheaper. Besides, the illumination intensity of light onto the solar cell and the luminous intensity of light emitted from the solar cell may be acquired at any stage during preparation of the solar cell, as a result, the method for testing solar cell performance provided in this embodiment may be applied to any preparation stage of the solar cell.

It shall be understood that the operation division in the various method implementations is used to facilitate description. In implementation, some operations may be combined into one or divided into a plurality of operations. As long as a same logic relationship is involved, the operations are all included in the protection scope of the present disclosure.

Another embodiment of the present disclosure provides an apparatus for testing solar cell performance, so as to implement the method for testing solar cell performance as provided in the above embodiment. The apparatus for testing solar cell performance as provided in this embodiment is described in details with reference to the drawings.

Figure 2:
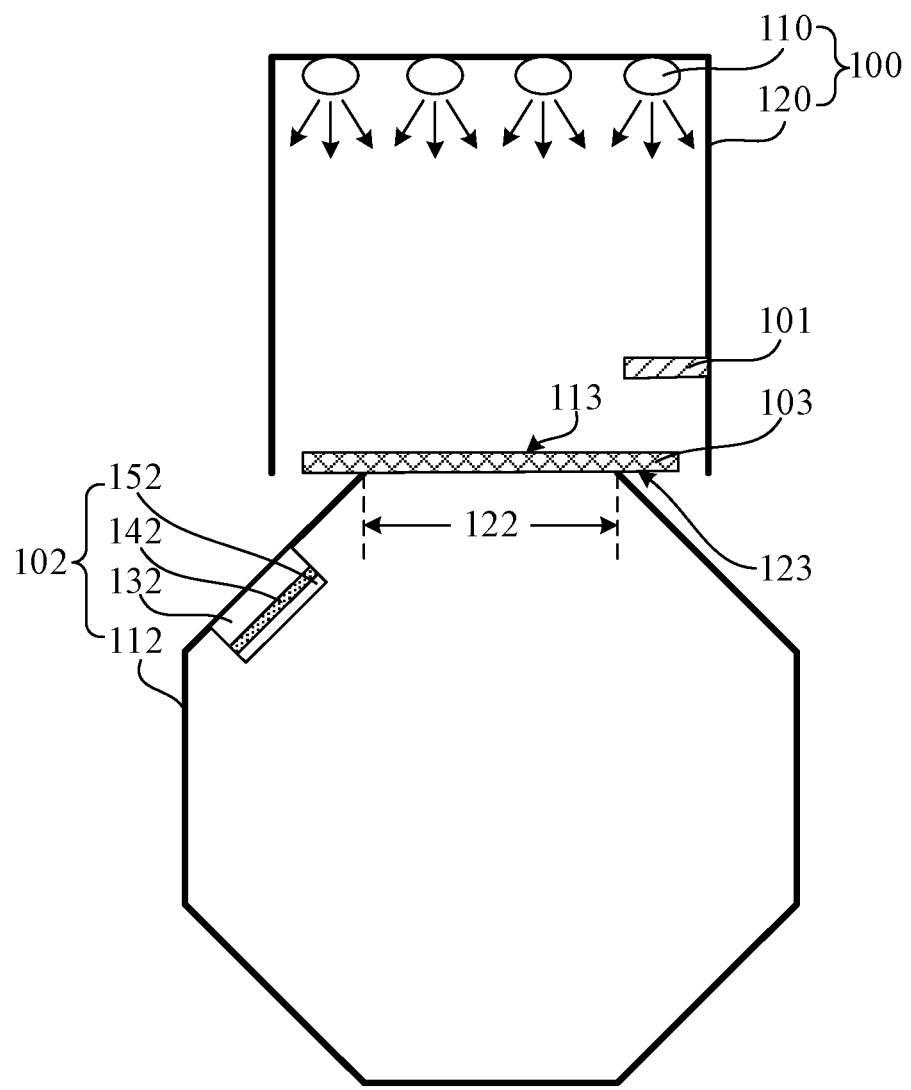
FIG. 2 is a structural schematic diagram showing of an apparatus for testing solar cell performance according to another embodiment of the present disclosure.
Figure 3:
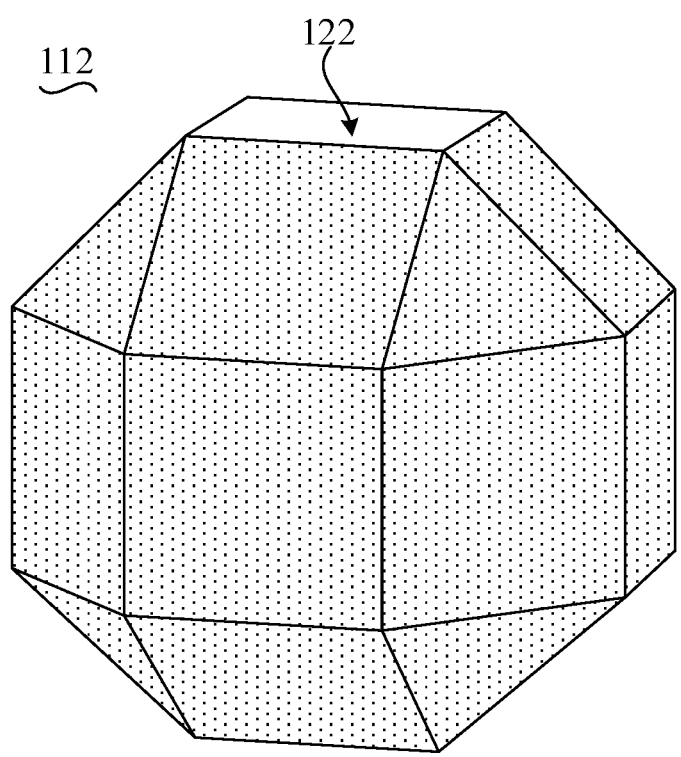
FIG. 3 is a three-dimensional schematic diagram showing a chamber in the apparatus for testing solar cell performance according to the embodiment of the present disclosure.
Figure 4:
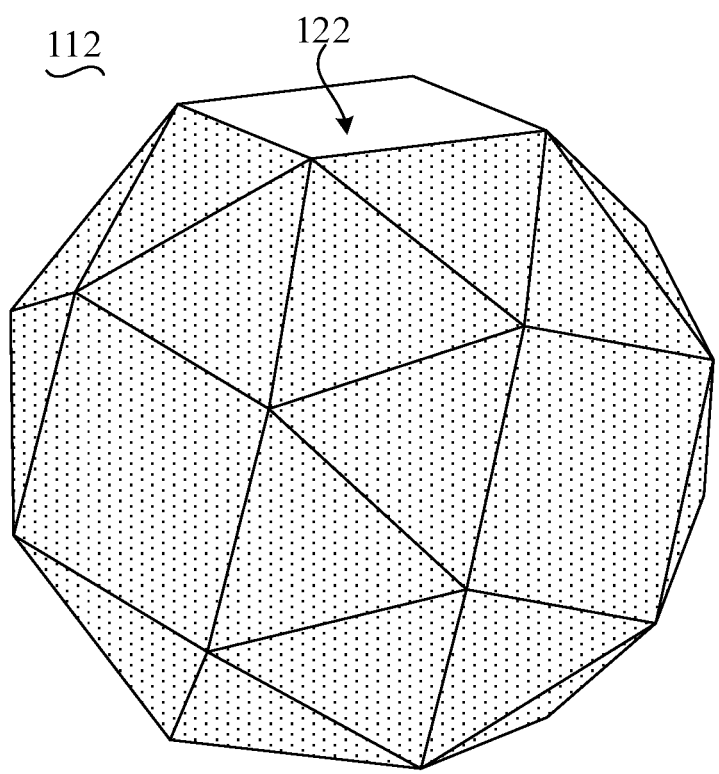
FIG. 4 is another three-dimensional schematic diagram showing a chamber in the apparatus for testing solar cell performance according to the embodiment of the present disclosure.

FIG. 2 is a structural schematic diagram showing an apparatus for testing solar cell performance. FIG. 3 is a three-dimensional schematic diagram showing a chamber in the apparatus for testing solar cell performance. FIG. 4 is another three-dimensional schematic diagram showing a chamber in the apparatus for testing solar cell performance. It shall be noted that in order to facilitate displaying a location relationship between modules in the apparatus for testing solar cell performance, both an illumination chamber included in an illumination module and a chamber included in a luminous intensity detection module are transparent, so that inside of cavities is clearly visible. In addition, a thickness of the illumination chamber included in the illumination module and a thickness of the chamber included in the luminous intensity detection module are bolded.

With reference to FIG. 2, the apparatus for testing solar cell performance includes an illumination module 100, an illumination intensity detection module 101 located on a transmission path of light emitted from the illumination module, and a luminous intensity detection module 102 located at a side of the illumination intensity detection module 101 away from the illumination module 100. The luminous intensity detection module 102 includes a chamber 112 having an opening 122 at a side of the chamber 112 close to the illumination module 100 and a luminous intensity detection unit 132 located on a side wall of the chamber 112. The opening 122 is provided to support the solar cell 103.

Herein, the illumination module 100 is configured to illuminate the solar cell 103. The illumination intensity detection module 101 is configured to detect an illumination intensity of light onto the solar cell 103. The luminous intensity detection module 102 is configured to detect a luminous intensity of light emitted from the solar cell 103 in response to being illuminated. Then, the solar cell performance may be analyzed based on the acquired illumination intensity onto the solar cell 103 and the luminous intensity of the solar cell 103.

In some examples, the opening 122 is covered by the solar cell 103. In this way, the solar cell 103 is able to separate light emitted from the illumination module 100 from light emitted from a surface of the solar cell 103 facing the luminous intensity detection module 102. This prevents the luminous intensity detection module 102 from receiving light emitted from the illumination module 100, and from taking the light emitted from the illumination module 100 as light emitted from the solar cell 103. This is advantageous for ensuring that light received by the luminous intensity detection module 102 is the light emitted from the solar cell 103, and is advantageous for improving detection accuracy of the luminous intensity detection module 102.

In some examples, the solar cell 103 has a first surface 113 and a second surface 123 that is opposite to the first surface 113. The illumination module 100 is configured to illuminate the whole first surface 113. The second surface 123 covers the opening 122. A ratio between an orthographic projection area of the opening 122 onto the second surface 123 and an area of the second surface 123 ranges from 0.1 to 0.99.

Herein, the ratio between the orthographic projection area of the opening 122 onto the second surface 123 and the area of the second surface 123 ranges from 0.1 to 0.99. This ensures that the solar cell 103 covers the opening 122 well, to prevent light emitted from the illumination module 100 from entering the chamber 112 through the opening 122 and from being detected by the luminous intensity detection module 102. This is advantageous for improving measurement accuracy of the luminous intensity detection module 102.

In some examples, the illumination module 100 includes a plurality of lamps 110 arranged in arrays. Each of the plurality of lamps 110 emits light having a same wavelength. Vertical distances between the plurality of lamps 110 and a plane where the opening 122 is provided are the same. This is advantageous for controlling different regions of the whole first surface 113 to absorb a same number of photons, thereby avoiding a case where luminous intensities of light emitted by different regions vary due to the fact that energies of photons acquired in different regions vary. This is advantageous for ensuring that, during a testing process, a main factor affecting the luminous intensity of the solar cell is the solar cell performance, for example, a defect in the solar cell. This excludes impact of an external environmental factor on the luminous intensity of the solar cell 103.

It shall be noted that, in FIG. 2, a plurality of arrows under the lamps 110 represent a transmission direction of light emitted from the lamps 110. In addition, in practice, the orthographic projection area of the illumination module 100 onto the first surface 113 may be greater than an area of the first surface 113.

In some examples, a main material for the solar cell 103 is silicon. In response to the silicon being illuminated, a wavelength of light emitted from the silicon ranges from 950 nm to 1200 nm. Therefore, the wavelength of light emitted from the lamps 110 may be controlled to be less than or equal to 950 nm. This is advantageous for further preventing taking light emitted from the lamps 110 as light emitted from the solar cell 103, when the luminous intensity detection module 102 is measuring the luminous intensity of the solar cell 103. This is advantageous for improving measurement accuracy of the luminous intensity detection module 102.

In some examples, a distance between the lamps 110 of the illumination module 100 and the first surface 113 of the solar cell 103 is no less than 1 cm. This is advantageous for an illuminated area caused by the light emitted from the lamps 110 on the first surface 113 to be greater than or equal to an area of the first surface, so as to ensure that the whole first surface 113 of the solar cell 103 receives light.

Herein, in some examples, the illumination module 100 further includes an illumination chamber 120 to accommodate the plurality of lamps 110 arranged in arrays and to concentrate emitted light from the lamps 110 onto the solar cell 103.

In some examples, the illumination chamber 120 may be a box-shaped chamber. The box-shaped chamber may be formed by five panels made of a light shielding material. The box-shaped chamber has a second opening (not shown in the drawings) for accommodating the solar cell 103, so that the solar cell 103 is covered by the box-shaped chamber. The box-shaped chamber includes a top panel farthest from the solar cell 103. The lamps 110 are located at a side of the top panel close to the solar cell 103. The illumination intensity detection module 101 is located at a side wall of the box-shaped chamber.

In some examples, the illumination intensity detection module 101 may be a photodiode.

In some examples, the chamber 112 is a polyhedral chamber formed by a light shielding material, and the polyhedral chamber has the opening 122.

It shall be noted that light is emitted from the solar cell 103 in a random direction in response to the solar cell being illuminated. In order to acquire an average luminous intensity of light emitted from the whole second surface 123 of the solar cell 103, it is required to simulate distribution of transmission directions of light emitted from the solar cell 103, so as to improve measurement accuracy of the luminous intensity detection unit 132. Because a plurality of inner walls of the chamber 112 have various inclination directions, distribution and transmission directions of the light emitted from the solar cell 103 may be randomized. After the light emitted from the solar cell 103 is reflected within the chamber 112 for a plurality of times, transmission directions of all the light within the chamber 112 may be equivalent to light emitted from any direction of the solar cell 103. Therefore, luminous intensities measured on the light from varied directions by the luminous intensity detection unit 132 are equivalent to an average luminous intensity of light emitted from the second surface 123 of the solar cell 103.

The chamber 112 is formed by the light shielding material. This is advantageous for preventing other light outside the chamber 112 from affecting the measurement result of the luminous intensity detection unit 132, and is advantageous for improving measurement accuracy of the luminous intensity detection unit 132.

In some examples, the polyhedral chamber may be formed by a plurality of triangular panels and a plurality of rectangular panels that are connected through edges of the panels. The polyhedral chamber is detailed with two examples in the following. It may be understood that the polyhedral chamber provided in this embodiment includes but not limited to the following two forms.

In one example, with reference to FIG. 3, the polyhedral chamber is formed by 17 rectangular panels having a same length in edge and 8 regularly triangular panels having a same length in edge. Edges of the regularly triangular panels have a same length as the edges of the rectangular panels. The polyhedral chamber has a square opening 122 formed by four square panels.

In another example, with reference to FIG. 4, the polyhedral chamber may be formed by 5 rectangular panels having a same length in edge and 32 regularly triangular panels having a same length in edge. Edges of the regularly triangular panels have a same length as edges of the rectangular panels. The polyhedral chamber has a square opening 122 formed by four regularly triangular panels.

In some examples, the luminous intensity detection unit 132 may be an InGaAs photoelectrical detector or a silicon photoelectrical detector.

In some examples, a main material for the solar cell 103 is silicon. In response to the silicon being illuminated, a wavelength of light emitted from the silicon ranges from 950 nm to 1200 nm. The InGaAs photoelectrical detector is sensitive to light within a wavelength range from 1000 nm to 1300 nm. Therefore, the InGaAs photoelectrical detector is advantageous for accelerating the acquiring of the luminous intensity of the solar cell 103, and is advantageous for reducing possibility that the InGaAs photoelectrical detector receives the light not emitted from the solar cell 103.

In some examples, the apparatus for testing solar cell performance may further include a first filter 142 and/or a second filter 152 located at a side of the luminous intensity detection unit 132 away from the side wall of the chamber 112.

The first filter 142 and/or the second filter 152 are described in detail in the following with reference to three examples.

In one example, the apparatus for testing solar cell performance may include the first filter 142 and the second filter 152. The first filter 142 is located at the side of the luminous intensity detection unit 132 away from the side wall of the chamber 112. The second filter 152 is located at a side of the first filter 142 away from the luminous intensity detection unit 132.

In another example, the apparatus for testing solar cell performance may only include the first filter 142. The first filter 142 is located at the side of the luminous intensity detection unit 132 away from the side wall of the chamber 112.

In still another example, the apparatus for testing solar cell performance may only include the second filter 152. The second filter 152 is located at the side of the luminous intensity detection unit 132 away from the side wall of the chamber 112.

In the above examples, the first filter 142 allows light having a wavelength less than a first preset value to pass through the first filter 142 to the luminous intensity detection unit 132. The first preset value ranges from 1220 nm to 1280 nm. The second filter 152 allows light having a wavelength greater than or equal to a second preset value to pass through the second filter 152 to the luminous intensity detection unit 132. The second preset value ranges from 930 nm to 990 nm.

Because the main material for the solar cell 103 is silicon. In response to the silicon being illuminated, the wavelength of light emitted from the silicon ranges from 950 nm to 1200 nm. The first filter 142 is provided for the luminous intensity detection unit 132, which is advantageous for preventing the luminous intensity detection unit 132 from receiving light having a longer wavelength than a wavelength of the light emitted from the solar cell 103. The second filter 152 is provided for the luminous intensity detection unit 132, which is advantageous for preventing the luminous intensity detection unit 132 from receiving light having a shorter wavelength of the light emitted by the solar cell 103. Both the first filter 142 and the second filter 152 are provided for the luminous intensity detection unit 132, which is advantageous for enabling the luminous intensity detection unit 132 to receive light having a wavelength range as a wavelength range of the light emitted from the solar cell 103. Therefore, the above three examples are advantageous for ensuring the luminous intensity detection unit 132 to receive light emitted from the solar cell 103, and are advantageous for improving of measurement accuracy of the luminous intensity detection unit 132.

Figure 5:
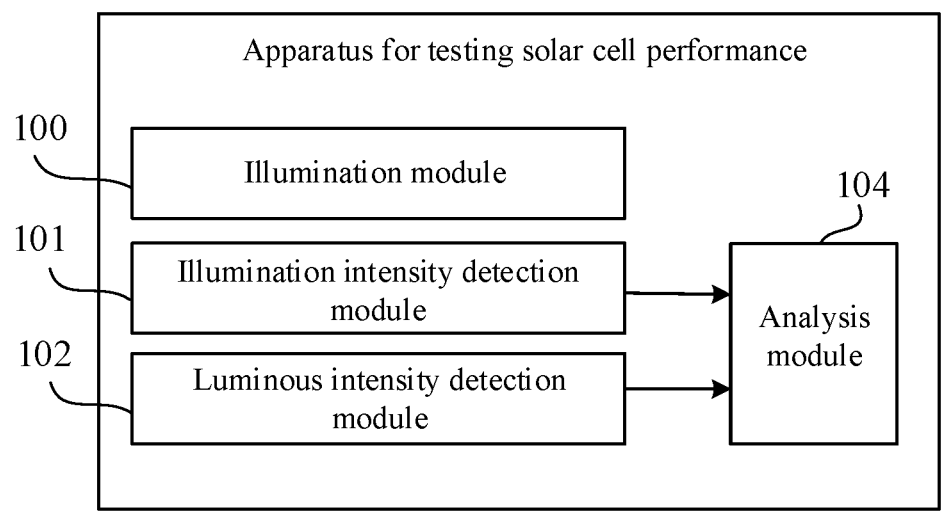
FIG. 5 is a block diagram of an apparatus for testing solar cell performance according to the embodiment of the present disclosure.

In addition, as shown in FIG. 5, the apparatus for testing solar cell performance may further include an analysis module 104. The analysis module 104 is configured to determine the solar cell performance based on the illumination intensity acquired by the illumination intensity detection module 101 and the luminous intensity acquired by the luminous intensity detection module 102. It shall be noted that this method for testing solar cell performance based on the illumination intensity and the luminous intensity may be referred to that in the previous embodiment and is not repeated here.

To sum up, in the apparatus for testing solar cell performance provided in this embodiment, the solar cell 103 does not have to be connected to the external circuit for testing. This is advantageous for preventing an effect on the testing caused by the solar cell 103 connecting the external circuit and by serial resistance, and is advantageous for improving result accuracy of the testing. In addition, the infrared imaging technology is not required and thus the testing is cheaper. Besides, an illumination intensity of light onto the solar cell 103 may be acquired through the illumination intensity detection module 102 and a luminous intensity of the solar cell 103 may be acquired through the luminous intensity detection module 102 at any stage during preparation of the solar cell 103. Therefore, the apparatus for testing performance of the solar cell 103 provided in this embodiment may be applied to any stage of preparation of the solar cell 103. In addition, the opening 122 of the chamber 112 is covered by the solar cell 103. This is advantageous for the solar cell 103 to separate light emitted from the illumination module 100 from light emitted from a side of the solar cell 103 facing the luminous intensity detection module 102. This prevents the luminous intensity detection module 102 from receiving light emitted from the illumination module 100. This is advantageous for ensuring that light received by the luminous intensity detection module 102 is the light emitted from the solar cell 103, and is advantageous for improving measurement accuracy of the luminous intensity detection module 102.

Those of ordinary skill in the art can understand that the above-mentioned embodiments are particular examples for realizing the present disclosure. In practice, various changes can be made to the embodiments in terms of form and details without departing from the scope of the present disclosure. Any person skilled in the art can make respective changes and modifications without departing from the scope of the present disclosure. Therefore, the protection scope of the embodiments of the present disclosure shall be subject to the scope defined by the claims.

What is claimed is:

1. A method for testing solar cell performance, comprising:
providing a solar cell;
illuminating the solar cell;
acquiring an illumination intensity of light onto the solar cell;
acquiring a luminous intensity of light emitted from the solar cell in response to the solar cell being illuminated; and
determining the solar cell performance based on the illumination intensity and the luminous intensity;
wherein the method further comprises: adjusting the illumination intensity, each illumination intensity corresponding to a respective luminous intensity; and
determining the solar cell performance based on the each illumination intensity and the corresponding respective luminous intensity, to determine an effect of varied illumination intensities on the solar cell performance.

2. The method according to claim 1, wherein the determining the solar cell performance based on the illumination intensity and the luminous intensity includes:
acquiring a local ideality factor based on the illumination intensity and the luminous intensity; and
acquiring the local ideality factor according to the following formula:

$$m = \frac{G}{I_{PL}} \times \left(\frac{dG}{dI_{PL}}\right)^{-1}$$

wherein, m is the local ideality factor, G is a generation rate, and IPL is the luminous intensity.

3. The method according to claim 2, wherein a relationship between the generation rate and the illumination intensity is:

$$G = \Phi_{illum} qW(1-R_{sample})$$

wherein, $\Phi_{illum}$ is the illumination intensity, q is an elementary charge, W is a thickness of the solar cell, and Rsample is an average reflectance of the solar cell.

4. The method according to claim 2, wherein the determining the solar cell performance further includes:
determining the solar cell performance according to the acquired local ideality factor,
indicating that the solar cell does not include an injection dependent recombination defect in a case that the local ideality factor is equal to 1;
indicating that the solar cell includes the injection dependent recombination defects in a case that the local ideality factor is greater than 1; and a higher local ideality factor indicating a greater impact of the injection dependent recombination defects on the solar cell performance.

5. The method according to claim 1, further comprising: acquiring an implied open-circuit voltage of the solar cell based on the luminous intensity, wherein a relationship between the implied open-circuit voltage and the luminous intensity is:

$$iVoc = \frac{kT}{q}\ln\left(\frac{I_{PL}}{C}\right)$$

wherein, iVoc is the implied open-circuit voltage, k is a Boltzmann constant, T is a temperature of an environment where the solar cell is located, q is an elementary charge, IPL is the luminous intensity and C is a calibration constant.

6. The method according to claim 1, wherein the solar cell has a first surface, and the method further comprises:
controlling to illuminate the whole first surface; and
controlling to illuminate the whole first surface with an uniform illumination intensity.

7. The method according to claim 1, wherein the solar cell has a first surface and a second surface that is opposite to the first surface; in response to the first surface being illuminated, the whole second surface emits light; and acquiring the luminous intensity of the emitted light includes:
acquiring an average luminous intensity of the light emitted from the whole second surface.

8. The method according to claim 1, wherein the solar cell is a finished solar cell or a semi-finished solar cell at any stage during a process for preparing the finished solar cell.

9. An apparatus for testing solar cell performance, comprising:
an illumination module;
an illumination intensity detection module, located on a transmission path of light emitted from the illumination module; and
a luminous intensity detection module, located at a side of the illumination intensity detection module away from the illumination module and including:
a chamber, having an opening at a side of the chamber close to the illumination module, the opening being provided to support the solar cell; and
a luminous intensity detection unit, located on a side wall of the chamber;
wherein the illumination module is configured to illuminate a solar cell that is provided;
wherein illumination intensity detection module is configured to acquire an illumination intensity of light onto the solar cell;
wherein the luminous intensity detection module is configured to acquire a luminous intensity of light emitted from the solar cell in response to the solar cell being illuminated; and
wherein the solar cell performance is determined based on the illumination intensity and the luminous intensity.

10. The apparatus according to claim 9, wherein the chamber is a polyhedral chamber formed by a light shielding material, and the polyhedral chamber has the opening.

11. The apparatus according to claim 9, wherein the luminous intensity detection unit is an InGaAs photoelectrical detector or a silicon photoelectrical detector.

12. The apparatus according to claim 9, further comprising: a first filter located at a side of the luminous intensity detection unit away from the side wall of the chamber; wherein, the first filter is configured to allow light having a wavelength less than a first preset value to pass through the first filter to the luminous intensity detection unit, the first preset value ranges from 1220 nm to 1280 nm.

13. The apparatus according to claim 12, further comprising: a second filter located at a side of the first filter away from the luminous intensity detection unit; wherein, the second filter is configured to allow light having a wavelength greater than or equal to a second preset value to pass through the second filter to the luminous intensity detection unit, the second preset value ranges from 930 nm to 990 nm.

14. The apparatus according to claim 9, further comprising: a second filter located at a side of the luminous intensity detection unit away from the side wall of the chamber; wherein, the second filter is configured to allow light having a wavelength greater than or equal to a second preset value to pass through the second filter to the luminous intensity detection unit, the second preset value ranges from 930 nm to 990 nm.

15. The apparatus according to claim 9, further comprising: an analysis module configured to determine the solar cell performance based on the illumination intensity acquired by the illumination intensity detection module and the luminous intensity acquired by the luminous intensity detection module.

16. The apparatus according to claim 9, wherein the illumination module includes a plurality of lamps arranged in arrays, the plurality of lamps are configured to emit light having a same wavelength, and vertical distances between each of the plurality of lamps and a plane where the opening is provided are the same.

17. The apparatus according to claim 9, wherein the solar cell has a first surface and a second surface that is opposite to the first surface, the illumination module is configured to illuminate the whole first surface, the second surface is configured to cover the opening, and a ratio between an orthographic projection area of the opening on the second surface and an area of the second surface ranges from 0.1 to 0.99.

* * * * *